United States Patent [19]

Ring et al.

[11] E Patent Number: Re. 32,182

[45] Reissued Date of Patent: Jun. 17, 1986

[54] METHOD FOR SCREENING, SEPARATING, AND REMOVING FIBER BUNDLES, LUMPS, KNOTS AND FOREIGN MATTER FROM AQUEOUS DISPERSIONS USED IN FORMING NON-WOVEN FABRICS BY WET-LAYING

[75] Inventors: Michael Ring, Warwick; Peter Angelini, Central Valley, both of N.Y.

[73] Assignee: International Paper Co., New York, N.Y.

[21] Appl. No.: 710,596

[22] Filed: Mar. 11, 1985

Related U.S. Patent Documents

Reissue of:

[64] Patent No.: 4,466,862
Issued: Aug. 21, 1984
Appl. No.: 467,333
Filed: Feb. 17, 1983

U.S. Applications:

[63] Continuation of Ser. No. 246,707, Mar. 23, 1981, abandoned.

[51] Int. Cl.[4] ..... D21C 5/18; D21C 5/20

[52] U.S. Cl. ..... 162/55; 209/143; 209/144; 209/250

[58] Field of Search ..... 162/55, 60; 209/143, 209/144, 250

[56] References Cited

U.S. PATENT DOCUMENTS

| | | | |
|---|---|---|---|
| 318,121 | 5/1885 | Klein | 19/84 |
| 690,178 | 12/1901 | Offermann | 19/84 |
| 1,009,576 | 11/1911 | Riemenschneider | 209/250 |
| 2,633,930 | 6/1950 | Carter | 209/144 |
| 2,931,076 | 4/1960 | Clark | 19/156 |
| 3,200,445 | 8/1965 | Morgan | 19/84 |
| 3,320,641 | 5/1967 | Bryan | 19/156.1 |
| 3,562,862 | 2/1971 | Walker et al. | 19/84 |
| 3,644,078 | 2/1972 | Tachibana et al. | 425/83 |
| 3,886,035 | 5/1975 | Laakso | 162/55 |
| 3,917,567 | 11/1975 | Barrett | 209/142 |
| 3,961,397 | 6/1976 | Neuenschwander | 19/65 |

FOREIGN PATENT DOCUMENTS

| | | | |
|---|---|---|---|
| 217879 | 5/1921 | Canada | 209/104 |
| 771498 | 11/1967 | Canada | 209/104 |
| 813700 | 5/1969 | Canada | 209/104 |
| 898708 | 4/1972 | Canada | 209/104 |
| 955563 | 10/1974 | Canada | 209/104 |
| 2526657 | 12/1976 | Fed. Rep. of Germany | 162/55 |
| 460078 | 11/1973 | U.S.S.R. | 209/250 |

*Primary Examiner*—Steve Alvo
*Attorney, Agent, or Firm*—Walt Thomas Zielinski

[57] ABSTRACT

Apparatus and method for use in making non-woven fabrics by wet-laying an aqueous dispersion. The apparatus and method screens, separates and remover fiber defects and foreign matter above a prescribed size from other dispersion fibers. The apparatus includes a housing having an inlet and several outlets, an accelerator within the housing for creating relative movement between the dispersion fluid and fibers to axially align at least some of the fibers in the direction of dispersion flow to disperse those fibers in the dispersion and a separator within the housing for separating bundles and lumps above a prescribed size from other dispersion fibers. The housing discharges the bundles and lumps above the prescribed size from the process at one outlet, and passes the other dispersion fibers through to another outlet for use in the wet-laying process. The method includes the steps of producing a stream of dispersion, directing the stream over a curvilinear path, creating relative movement between the dispersion fibers and fluid to axially align at least some of the fibers in the direction of dispersion flow, screening fiber bundles and lumps above a prescribed size from other dispersion fibers by intercepting the stream along a curvilinear path at a lateral stream boundary and washing accumulated fiber bundles and lumps above the prescribed size from the screen for discharge from the process and passing the other dispersion fibers for use in the wet-laying process.

3 Claims, 7 Drawing Figures

METHOD FOR SCREENING, SEPARATING, AND REMOVING FIBER BUNDLES, LUMPS, KNOTS AND FOREIGN MATTER FROM AQUEOUS DISPERSIONS USED IN FORMING NON-WOVEN FABRICS BY WET-LAYING

Matter enclosed in heavy brackets [ ] appears in the original patent but forms no part of this reissue specification; matter printed in italics indicates the additions made by reissue.

This is a continuation of application Ser. No. 267,707, filed Mar. 23, 1981, now abandoned.

This invention relates generally to the making of non-woven fabrics by the process of wet-laying an aqueous fiber dispersion and more particularly to apparatus and method for screening, separating and removing fiber defects which occur in the form of lumps, bundles and knots and foreign matter, which are above a prescribed size from other dispersion fibers.

BACKGROUND OF THE INVENTION

In recent years paper and paper product manufacturers have recognized that variants of technology commonly used in paper production can be adapted for making fabrics of inexpensive and durable form. Manufacturers recognize that acceptable substitutes for fabrics made by weaving continuous fiber filaments in the conventional manner can be found in non-woven fabrics produced by processes such as wet-laying synthetic fiber filaments with paper-making equipment.

In the wet-laying process, an aqueous dispersion containing synthetic fiber filaments of predetermined diameter, length and rigidity is distributed over a moving wire or web. The fiber filaments accumulate on the advancing web as the dispersion liquid drains away. The result is a layer of fabric composed of intertwined fibers. To enhance fabric strength, [manufacturer] *manufacturers* may add binding agents to the formed sheet to improve fiber cohesion. Description of typical wet-laying processes using paper-making equipment can be found in U.S. Pat. No. 3,808,095, and U.S. Pat. No. 3,839,142.

Manufacturers however have encountered difficulties in making non-wovens by wet-laying synthetic fibers. For example, during processing, manufacturers have found that fibers initially introduced to establish the dispersion may fail to completely separate, or, once separated, may be caused to interact and entangle. Fibers may fail to initially disperse as a result of cohesion caused by defects in the fibers created when they are first sliced to the desired lengths. Heat generated in slicing can distort the fiber ends causing either burrs to mechanically bind the fibers or welds to physically join them. Failure of the fibers to separate results in fiber bundles within the dispersion. Further, once separated, fiber defects may act as catches to snare and entangle fibers as they come in contact. Additionally, the very turbulence initially necessary to separate the fibers can cause continued interaction between the fibers resulting in lumps much in the way hair in water interacts and entangles.

The tendency for fibers to lump and entangle in turbulence is particularly a problem where manufacturers have attempted to improve fabric characteristics such as strength, softness of hand and drape by using thin, long and flexible fibers. Particularly where long thin and flexible fibers having length to diameter ratios of 400 to 3000 and higher, as for example 1.5 denier by one inch and 3.0 denier by one and one half inches, are used to improve fabric characteristics, manufacturers have found a substantial increase in the tendency for the fibers to entangle themselves into lumps.

Fiber bundles and lumps present in the dispersion due to failure to initially separate or to subsequent entanglement give rise to nonuniformity in the fabric sheet. As the dispersion is introduced to and the fibers laid upon the web, the bundles and lumps tend to disrupt even distribution of fiber over the web, producing regions of high and low fiber density. The result is a nonuniform and weak fabric which is commercially unacceptable.

Manufacturers have therefore endeavored to establish and maintain dispersion of the fiber filaments during processing. In an attempt to obtain uniformity, manufacturers have in the past used chemical agents to disperse the fibers and maintain them dispersed. Particularly, foam agents have been suggested for this purpose. However foams have been found difficult to use. Particularly, during processing, manufacturers have found [over agitated] *over-agitated* foams float the fiber filaments out of the dispersion, depleting the dispersion of fibers. Additionally, foams are undesirably expensive.

As an alternative, liquid agents have also been tried. Hereto, however, drawbacks have been encountered. Particularly, those liquid agents which enhance the dispersion of long individual fibers cannot disperse fibers with welded ends due to poor cutting or multiple fiber rods which are the result of poor spinning. Additionally, it is found that there can occur certain small percentages of over length fibers, e.g. 2× and 3× specified length, which under prolonged agitation will form tangles and clumps. As a result, liquid agents have not completely solved the dispersion and subsequent entangling problems associated with thin, long and flexible fibers.

Further description and explanation of the nature of non-woven fabric making by wet-laying, the difficulties encountered with thin, long and flexible synthetic fibers in aqueous dispersions and the use of chemical agents as possible solutions may be found in U.S. Pat. No. 4,049,491 to Ring et al., entitled "Viscous Dispersion for Forming Wet-Laid, Non-Woven Fabrics" filed Feb. 20, 1975 and issued Sept. 20, 1977.

SUMMARY OF INVENTION

It is therefore an objective of this invention to provide apparatus and method for use in the formation of non-woven products by the process of wet-laying which permits the production of defect free webs by the use of relatively thin, long and flexible fiber filaments.

It is yet a further objective of this invention to provide apparatus and method for use alone or in combination with chemical agents to promote and maintain thin, long and flexible fibers dispersed in the dispersion used in a wet-laying processes for forming non-woven fabrics.

It is a still further objective of this invention to permit separation of fiber filaments in bundles and lumps above a prescribed size from other dispersion fibers to reduce nonuniformities in the non-woven product formed.

In accordance with this invention, apparatus is described for screening, separating and removing fiber defects such as bundles and lumps and foreign matter which are above a prescribed size from other dispersion fibers. The apparatus includes a housing having an inlet for receiving the dispersion, a first outlet for discharging fibers for use in the wet-laying process and a second outlet for discharging rejected fiber bundles and lumps and foreign matter above a prescribed size for removal from the process. Contained within the housing is an accelerator in the form of one or more accelerating chambers in fluid communication with the inlet. The accelerator creates relative acceleration between the fibers and the dispersion fluid to cause at least the individual fibers to disperse as they axially align with the fluid stream. The housing further includes a separator in fluid communication with the accelerator and the first and second outlet. The separator receives dispersion from the accelerator and separates fiber bundles and lumps and foreign matter which are above a prescribed size from other fibers. The bundled and lumped fibers and foreign matter rejected are moved to the second outlet for discharge and the passed fibers permitted to flow through to the first outlet for use in the wet-laying process.

In preferred form, the accelerator is a plurality of annular chambers coaxially and rotatively mounted within a cylindrical housing. The chambers are in fluid communication with the housing inlet and multiple outlets. The housing inlet is provided with a flow directing means in the form of a plurality of ribs which divide the inlet dispersion streams into a plurality of substreams each of which is in alignment with an annular chamber of the accelerator. Each annular accelerator chamber is defined by end wall discs coaxially disposed within the housing main body, a spacer disc coaxially between the end wall discs and a sleeve for enclosing the multiple discs. In an alternative embodiment, the sleeve is eliminated and the housing cyclindrical wall is substituted for the sleeve.

In preferred form, each chamber has opposing annular end walls formed by the end wall discs, a closed inner radial side wall formed by the spacer disc and an at least partially open outer radial wall formed by the sleeve or in an alternate embodiment the housing cylindrical wall. The chamber's end wall and spacer discs are rotatively mounted in the housing by means of a drive shaft fixed to the chamber end wall and spacer discs which is rotatively and coaxially received in the housing.

In preferred form, the apparatus separator is formed by perforating the accelerator outer radial wall with a system of slots. In this arrangement, one slot of prescribed length and width is provided at each chamber's at least partially open outer radial side wall, in the region of the housing's first outlet. The separator slots reject fiber bundles and lumps and foreign matter which are above a prescribed size for subsequent exit from the housing by the second outlet and permits passage of the other filaments for exit from the housing. In preferred form, the separator slots are each formed through the accelerator outer radial wall with a gradually restricted profile to [inhance] *enhance* fiber alignment.

In preferred form, the inlet is located on the housing main body element at a first circumferential location and is mounted tangentially to the body element. The first outlet is located at a second circumferential location on the housing displaced from the inlet by a prescribed angle and mounted with respect to the main body element at a prescribed mounting angle. The second outlet is located at a third circumferential location on the main body element displaced from the first outlet by a prescribed angle and mounted perpendicularly to the body element.

In preferred form, the perimeter of each annular chamber end wall disc is provided with a radial projection extending circumferentially around the disc edge. The projection is of thickness less than the disc and is received in a circumferential groove in the sleeve, or, in an alternate embodiment, the inner housing wall. The radial projections and companion grooves permit isolation of the accelerator chambers and free rotation of the discs while preventing binding of the discs by the fibers.

In a preferred form, the sleeve is made in axially split halves having formed therein the end wall disc grooves, and the separator slots. In this form, the grooves are axially spaced between the separator slots. In another preferred form of the invention the housing is formed in axially split halves, and the sleeve is eliminated. In this form, the housing inner wall, performs the function of the sleeve; the wall halves having the grooves and separator slot formed therein similarly to the sleeve.

The method of the invention includes first producing a dispersion stream containing the dispersion fluid with desired chemical additives, disoriented individual fibers and bundled and lumped fibers. The method requires the stream be directed over a curvilinear path during which the lateral stream boundaries are accelerated causing relative movement between the dispersion fibers and the dispersion fluid. As a result of the relative movement, at least the individual fibers are axially aligned with and dispersed in the fluid stream. Following alignment of the fibers, the dispersion stream is screened to remove fiber bundles and lumps and foreign matter which are above a prescribed size. Thereafter the screened stream is permitted to proceed for use in the wet-laying process. In carrying out the screening step, the outer lateral boundary of the stream is intercepted for screening as the stream is directed over the curvilinear path. Following screening, rejected fiber bundles and lumps and foreign matter above the prescribed size are washed from the separator by the flow of dispersion over the separator.

DESCRIPTION OF THE DRAWINGS

These and other objectives, advantages and features of the invention will become clear from the following description read in conjunction with the accompanying drawings in which:

FIG. 5 is an end elevation view of an alternate form of the apparatus housing in accordance with the Invention.

DESCRIPTION OF THE INVENTION

I

The Apparatus

A. The Housing

Figure 1:
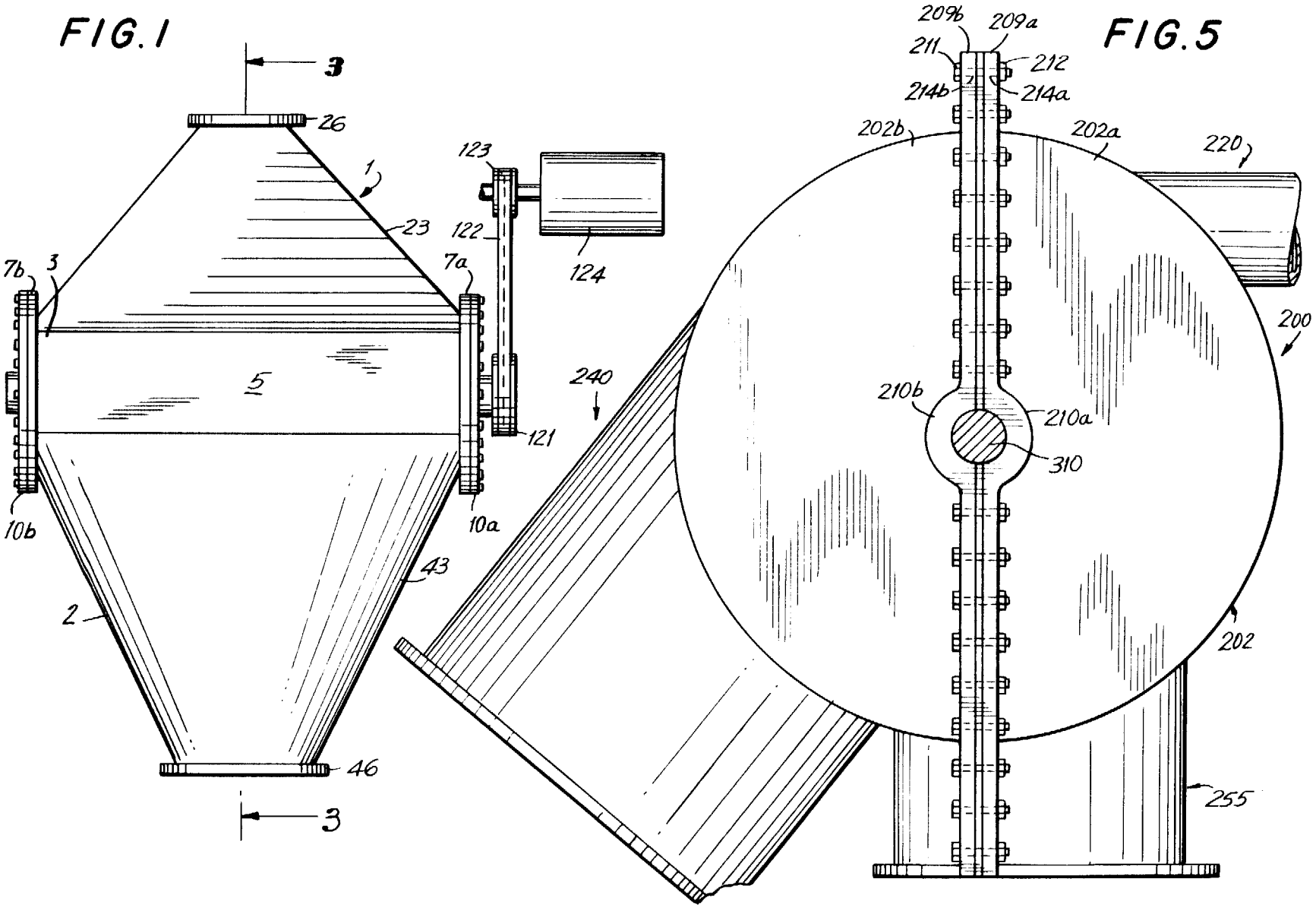
FIG. 1 is a top elevation view of the apparatus in accordance with the Invention.
Figure 2:
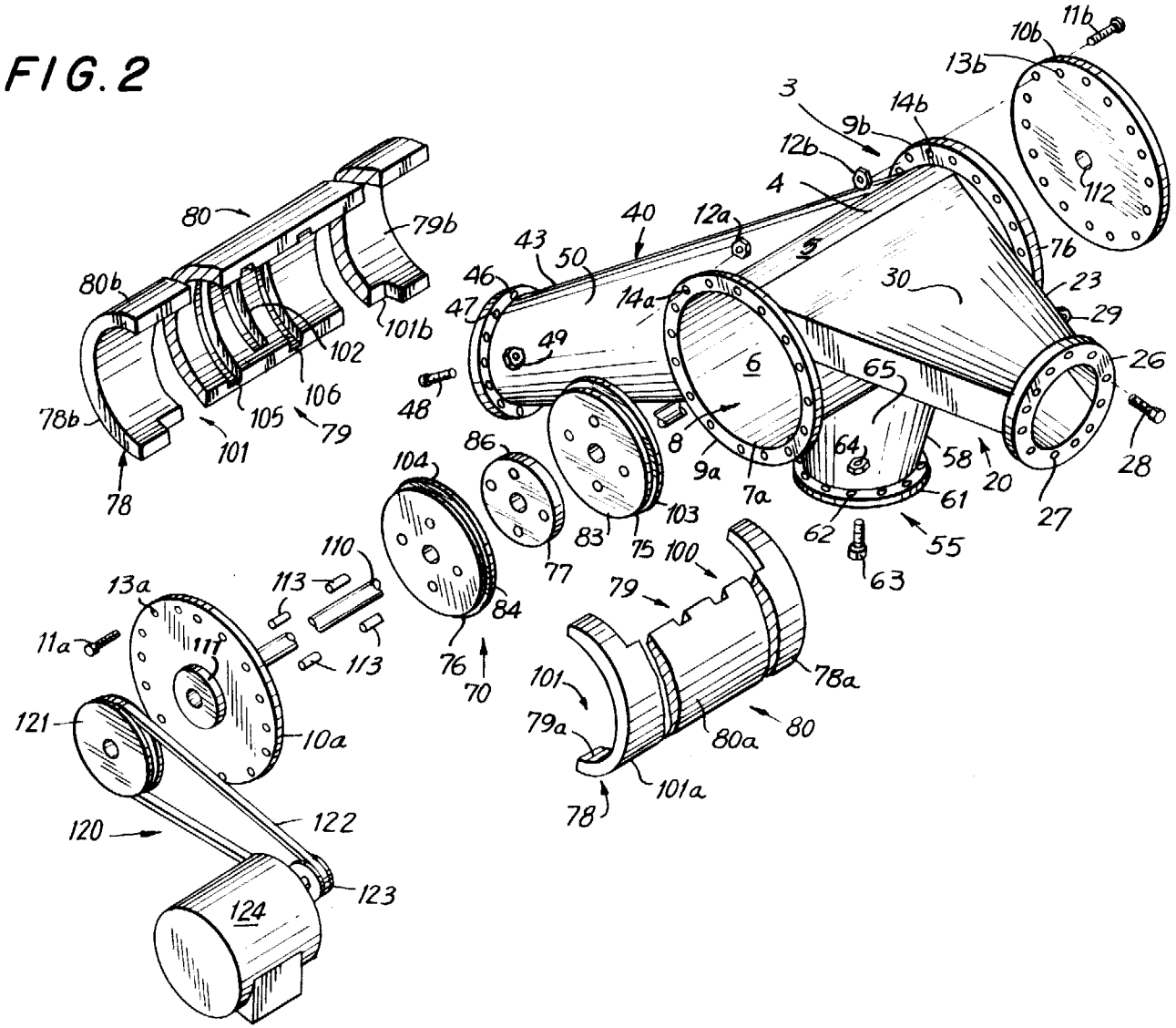
FIG. 2 is an exploded perspective view of the apparatus in accordance with the Invention.

In accordance with the invention, and as shown in FIG. 1, the apparatus 1 features a housing 2 having a main body element 3. As seen in FIG. 2, main body element 3 has a cylindrical wall 4 with an outer surface 5 and inner surface 6. Body element 3 has open axial ends 7a and 7b and an open cylindrical interior chamber 8 bounded by inner surface 6. Open ends 7a and 7b are formed with flanges 9a and 9b respectively. The axial length of body element 3 and its internal diameter are selected to accommodate one or more accelerator chambers, to be described. Straps or feet (not shown) may be used to support the housing from overhead or from below respectively. Body element 3 may be made in any suitable manner, as for example, by casting a conventional alloy such as iron or aluminum or by molding a high impact plastic.

Housing 2 also includes end caps 10a and 10b for closing body element open ends 7a and 7b respectively. As shown in FIG. 2 end caps 10a and 10b are circular in shape and of sufficient radius to be at least radially co-extensive with body element end flanges 9a and 9b. End caps 10a and 10b are joined to the body element 3 at flanges 9a and 9b by bolts 11a, 11b and nuts 12a, 12b. Bolts 11a, 11b are positioned through a plurality of holes 13a, 13b in end caps 10a, 10b and holes 14a, 14b in flanges 9a, 9b. Holes 13a, 13b, 14a and 14b are located circumferentially of the outer edge of the respective end caps 10a, 10b and flanges 9a, 9b as shown. Bolts 11a, 11b, nuts 12a, 12b and the mating surfaces of end caps 10a, 10b and flanges 9a, 9b establish a fluid seal between the end caps and the housing. As will be appreciated by those skilled in the art, any suitable arrangement may be used to establish mounting and fluid sealing. End caps 10a and 10b may be made in the same manner and of the same materials as described above for body element 3.

Figure 3:
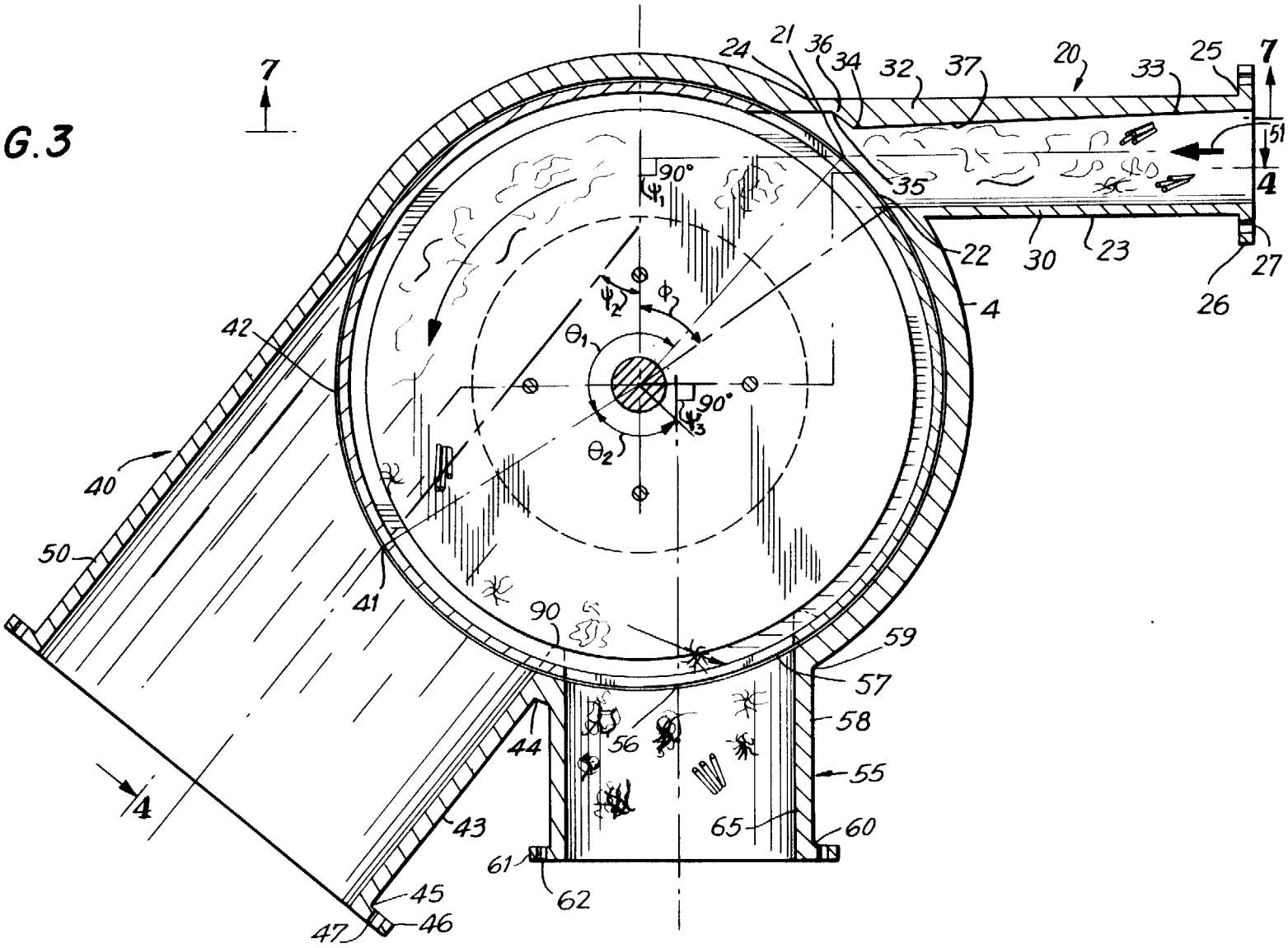
FIG. 3 is a section view of the apparatus in accordance with the Invention taken along lines 3—3 of FIG. 1.

As best seen in FIG. 3, a dispersion inlet 20 is located on body element 3, centered at a circumferential point 21. In preferred form, point 21 is selected so that inlet 20 may be located at the top of body element 3. Location of inlet 20 at the top of body element 3 permits gravity to assist flow of the dispersant through housing interior chamber 8.

Inlet 20 includes an inlet port 22 and inlet conduit 23. Inlet port 22 extends through body element wall 4 and permits entry of the dispersion to housing interior chamber 8. In the preferred form shown, inlet port 22 is substantially rectangular and located axially centrally of and extending sufficiently over the length of wall 4 to permit fluid communication with the elements within chamber 8 as best seen in FIG. 4.

As shown in FIGS. 2 and 3, inlet conduit 23 has a housing end 24 which conforms to port 22 and in the preferred form is generally rectangular. The conduit end 24 is fixedly joined to wall 4 as for example by being cast or molded with the housing or by affixing a separate member to wall 4. Conduit 23 also has a source end 25 which has a flange 26 for coupling the conduit to a dispersion source (not shown). In preferred form, the conduit end 25 and flange 26 are circular. Flange 26 has a plurality of holes 27 located circumferentially at its outer edge to receive bolts 28 for cooperation with nuts 29. Flange 26, bolts 28 and nuts 29 permit fluid seal between the inlet conduit and the dispersant source. As will be appreciated, any suitable means may be used to fluidly couple inlet 20 to the dispersion source.

Conduit 23 further includes a coupling section 30 joining conduit source end 25 to housing end 24. The length and interior contour of section 30 is selected to provide a smooth transition from source end 25 to housing end 24. The smooth transition is intended to minimize turbulence and thereby discourage fiber entanglement as dispersion flows through inlet 20. In preferred form, coupling 30 has substantially straight lined side walls which diverge from source end 25 to housing end 24 as shown in FIG. 1. The lenth of conduit coupling 30 is between 4 to 5 times the diameter of body element 3 in preferred form. Additionally, coupling section 30 is of gradually increasing cross-section from source end 25 to housing end 24 as shown in FIGS. 1, 2 and 4. The reasons for section 30's increasing cross-section will be more fully described in connection with the explanation of apparatus operation.

Figure 4:
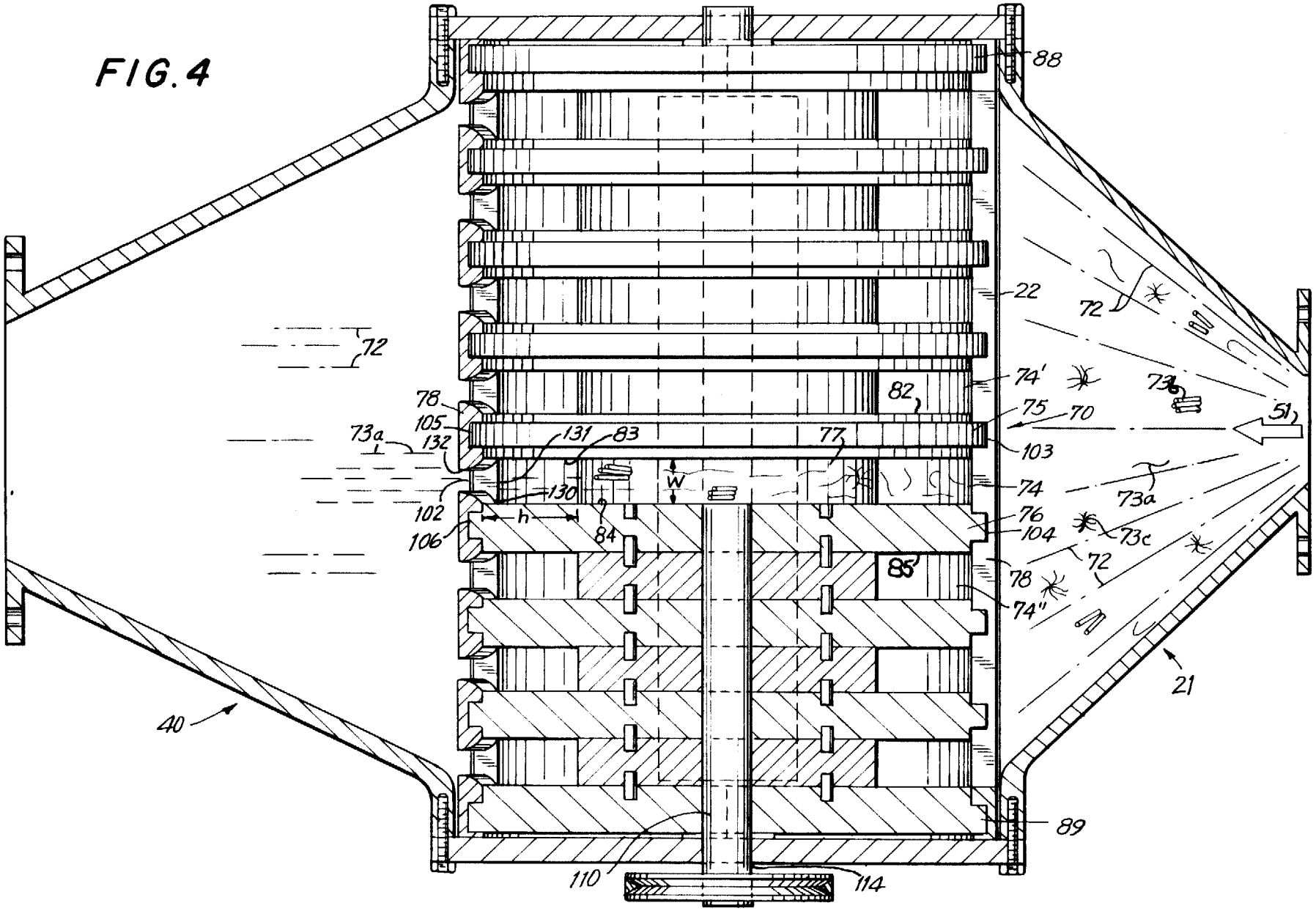
FIG. 4 is a section view of the apparatus in accordance with the Invention taken along lines 4—4 of FIG. 3.
Figure 7:
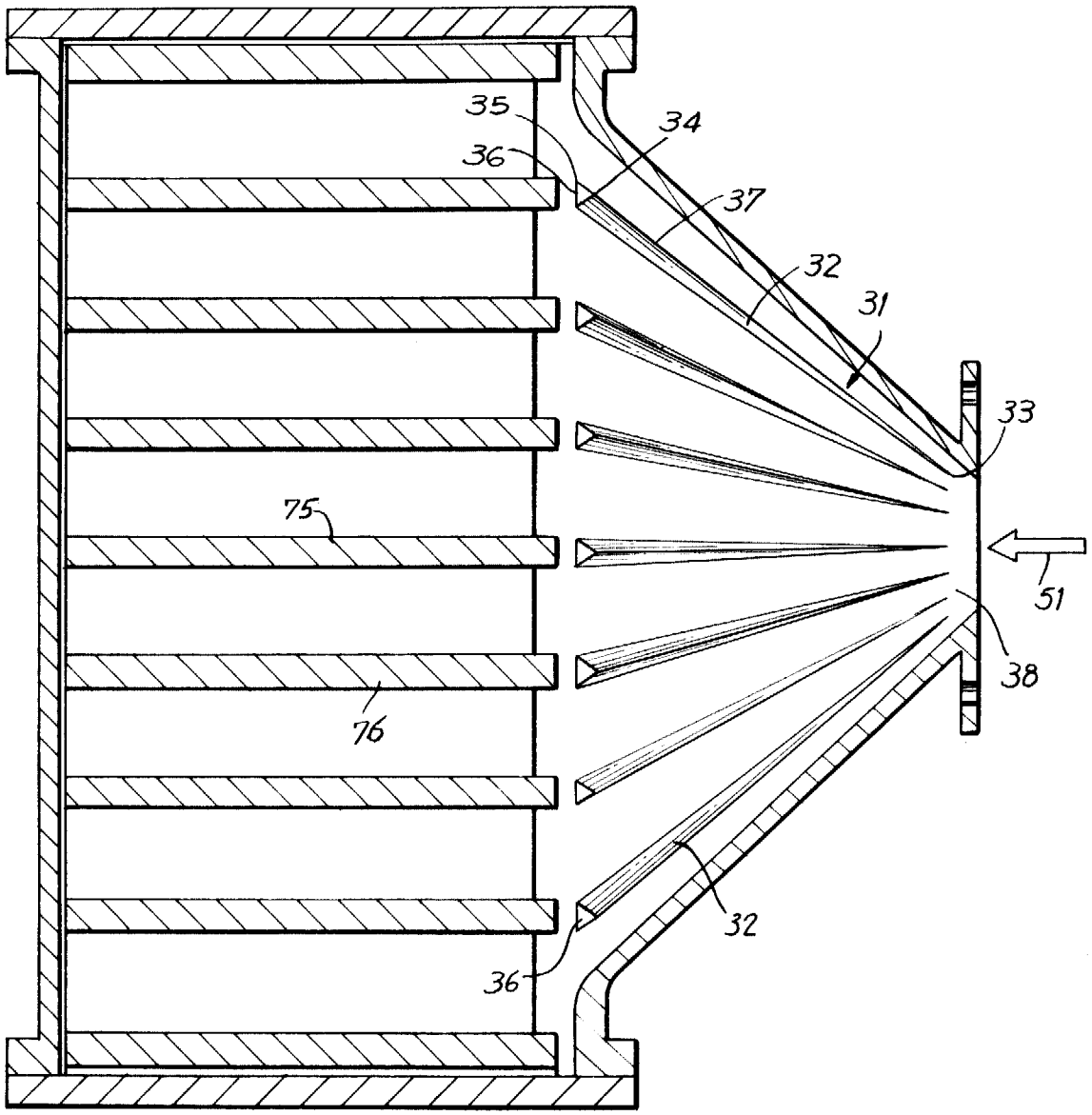
FIG. 7 is a section view of the apparatus in accordance with the Invention taken along lines 7—7 of FIG. 3.

In preferred form, where the apparatus accelerator includes a plurality of chambers as shown in FIG. 4 coupling section 30 includes a flow director 31 as shown in FIG. 7 for dividing the inlet dispersion stream into a plurality of substreams. Flow director 31 aligns the dispersion substreams with the plurality of accelerators to minimize turbulence and fiber intanglement as the dispersion enters the respective chambers.

As shown in FIGS. 3 and 7, in preferred form, flow director 31 is comprised of a plurality of like flow directing ribs 32. Each rib 32 is straight lined and of progressively increasing height, rising at a shallow angle from a first end 33 to a point 34 of maximum height proximate its second end 35 as seen in FIG. 3. As best seen in FIG. 3, from maximum height point 34, rib 32 falls at a steep angle to second end 35.

Additionally, as best seen in FIG. 7 each rib 32 is of tappered thickness from a maximum width at base 36 to a minimum width at upper edge 37. Further, base 36 is itself tappered over each rib's length from a maximum width at end 35 to a minimum width at end 33. Each rib 32 has a maximum height of approximately 20% of inlet conduit 23's internal height, and is located at approximately 95% of each rib's length as measured from end 33. The length of each rib 32 is approximately 90% of conduit 23's length as seen in FIG. 3. The maximum width of each rib at rib end 35 is approximately the width of the accelerator chamber end wall discs, e.g., 75, 76 as seen in FIG. 7.

Each rib 32 is therefore of an elongated fin shape having a triangular profile and progressively deminished triangular cross-section.

As seen in FIG. 7, Ribs 32 are arranged in Conduit 23 in a fan pattern. Ribs 32 are positioned with minimal height ends 33, at minimal separtion at point 38 set back from source end 25 by approximately 10% of conduit 23's length and with ends 35 at maximum separation at inlet port 22 adjacent the accelerator end wall discs, e.g. 75, 76. Further, ribs 32 are located in conduit 23 with ends 35 in alignment with the accelerator chamber's end wall discs, e.g., 75, 76 as shown in FIG. 7.

Ribs 32 may be located in either the roof or floor of conduit 23 and may be formed in any convenient manner, as for example by casting a molding with conduit 23.

With this arrangement, dispersion stream 51 entering inlet 20 is gradually and progressively urged to divide into substreams which flow into the multiple chambers of the apparatus accelerator. By making flow directing ribs 32 in an elongated fin shape as described and by positioning them in inlet conduit 23 in a fan pattern as noted, ribs 32 present minimal initial and subsequent progressively greater projection into the dispersing stream. This configuration permits gradual and smooth division of the stream into substreams for channeling to the multiple accelerator chambers so as to minimize turbulence and the potential for fiber entanglement.

Inlet conduit 20 is mounted on body element 3 so that the dispersant may be introduced to interior chamber 8 at an angle to minimize turbulence. The angle is selected to reduce interaction between the dispersant and the internal elements of housing 2. In preferred form, inlet 20 is joined substantially tangentially to the top of body element 3 with the inlet conduit center line at an angle $\Psi_1$ of 90° to body element 3's vertical center line as, best seen in FIG. 3.

Housing 2 further includes an outlet 40 to permit exit of dispersion from housing interior chamber 8 for use in the wet-laying process. As best seen in FIG. 3, the process dispersion outlet 40 is located on body element 3 centered at a circumferential point 41. Point 41 is displaced angularly from the dispersant inlet mounting point 21 by a predetermined angle $\theta_1$. The angular displacement of outlet 40 from inlet 20 is selected both to define the apparatus accelerator chamber length and to enable dispersion leaving housing interior chamber 8 to distribute over the full length of the apparatus separator. In preferred form, point 41 is displaced from point 21 by an angle $\theta_1$ of between 110 and 160 degrees.

Dispersant outlet 40 includes an outlet port 42 and an outlet conduit 43. Port 42 extends through wall 4 and permits exit of dispersant from interior chamber 8. In the preferred form, port 42 is elliptical and located axially centrally on wall 4 with its major axis extending over an axial length of wall 4 sufficient to permit fluid communication with the elements within chamber 8 as best seen in FIG. 4. In preferred form, the major axis of port 42 extends over the axial length of housing 2.

Outlet conduit 43 has a housing end 44 which conforms to outlet port 42, and is fixedly mounted to port 42 as for example by being cast or molded with the housing or by affixing a separate member to the housing. Dispersion outlet conduit 43 also has a discharge end 45, which in the preferred form, is circular. Outlet discharge end 45 is provided with flange 46 to permit coupling to further conduits (not shown) for supplying dispersant to other process stations. As in the case of inlet flange 26, the outlet flange 46 is provided with a plurality of holes 47 extending through flange 46 and circumferentially of flange 46's outer radial edge for receiving bolts 48 to cooperate with nuts 49 for joining the dispersant outlet conduit to further process stations in fluid sealing relation. Again as will be appreciated by those skilled in the art, any suitable means may be used for effecting fluid coupling between the dispersion outlet 40 and other process stations.

Outlet conduit 43 also has a coupling section 50 which joins the conduit housing end 44 to conduit discharge end 45. As in the case of inlet conduit coupling 30, coupling 50 is contoured to provide a smooth transition from the housing end 44 to discharge end 45 to minimize turbulence and discourage fiber entanglement. Coupling section 50 in preferred form is of gradually increasing cross-section from discharge end 45 to housing end 44 as shown in FIG. 4.

Dispersion outlet conduit 43 is mounted to body element 3 to permit exit of the dispersant from the housing interior chamber 8 at a desired angle. The angle is selected to permit dispersion to wash over the full length of the apparatus separator, to be described, and to permit reduced turbulence in the dispersion exiting interior chamber 8. In the preferred embodiment, outlet conduit 43 is mounted to body element 3 such that conduit 43's center line intersects body element 3's vertical center line at an angle $\Psi_2$ of from between 30 to 50 degrees as seen in FIG. 3.

Housing 2 further includes an outlet 55 for discharging bundled and lumped fiber from interior chamber 8. As best seen in FIG. 3, outlet 55 is located centered at a circumferential point 56 on body element 3. Point 56 is displaced from process dispersion outlet mounting point 41 by prescribed angle $\theta_2$. The angle of displacement of outlet 55 from outlet 41 is selected to permit efficient discharge of fiber bundles and lumps and foreign matter from interior chamber 8. In the preferred embodiment, the angle is selected so that the angular component of fiber velocity does not carry fiber rejected by the separator past discharge outlet 55.

Like the inlet 20 and process dispersion outlet 40, bundled and lumped fiber outlet 55 includes an outlet port 57 and an outlet conduit 58. Port 57 is located through body element wall 4 and permits exit of rejected bundled and lumped fibers and foreign matter from interior chamber 8. In preferred form, port 57 is elliptical and located approximately axially centrally of and with its major axis extending over a length of wall 4 sufficient to permit removal of rejected bundles and lumped fibers and foreign matter from chamber 8, as best seen in FIGS. 2 and 3. Port 47 is provided with a cross-section sufficient to permit free exit of rejected fibers and foreign matter from the housing 2. In preferred form, the major axis of port 57 extends the axial length of housing 2.

Fiber outlet conduits 58 has a housing end 59 which conforms to outlet port 57 and in the preferred embodiment is accordingly elliptical. Outlet port housing end 59 is fixedly mounted to outlet port 57. As in the case of other conduits, housing end 59 may be mounted to the port in a variety of ways as for example by casting or molding the conduit 58 with body element 3 or by affixing a separate member to body element 3. Conduit 58 is also provided with a discharge end 60 which in the preferred embodiment is circular in shape. Like other conduits, discharge end 60 is provided with a flange 61 having a plurality of circumferentially located holes 62 through the flange at the flange's outer radial extent. Like the other joints, bolts 63 and cooperative nuts 64 are provided to facilitate coupling the fiber outlet, in fluid sealing relation, to other system conduits (not shown). As in the case of the inlet and dispersion outlet, any suitable arrangement may be used to effect a fluid seal at outlet 55. Once discharged, the bundled and lumped fiber may be discharged or processed for some other use.

As with other conduits, the outlet conduit 58 includes a coupling section 65 for joining conduit housing end 59 to discharge end 60. Coupling section 65 is contoured to provide a smooth transition from the housing end 59 to the discharge end 60. In the case of the discharge conduit 55, the smooth transition is to permit efficient discharge from the interior of chamber 8. Like coupling section 30 and 50, in the preferred embodiment coupling section 65 is of gradually increasing cross-section from discharge end 60 to housing end 59 as seen in FIG. 2.

Bundled and lumped fiber outlet 55, like the dispersion inlet 20 and the process dispersion outlet 40, is mounted at a prescribed, angle to body element 3. In preferred form, the center line of outlet conduit 55 is located at an angle $\Psi_3$ of 90° to the horizontal center line of body element 3 as best seen in FIG. 3. Outlet conduit 55 is mounted in this manner to permit maximum gravity assistance to discharge of the lumped and tangled fibers from housing interior chamber 8.

B. The Accelerator

Located within housing internal chamber 8 is an accelerator 70 as shown in FIGS. 2 and 4. Accelerator 70 interacts with the dispersion stream 51 entering the housing at inlet 20 to cause relative acceleration between the dispersion fluid 72 and dispersion [fluid] *fibers* 73. Typically the dispersion fluid includes water and any desired wetting agents or viscosity modifiers as are well-known in the art. The dispersion fibers include disoriented individual fibers 73a, bundled fibers 73b and lumped fibers 73c. In response to frontal area drag forces, the relative acceleration between the fluid 72 and the fibers 73a and 73b cause the fibers to axially align with the dispersion fluid stream 51. However, since bundles 73b are of larger mass and greater rigidity than fibers 73a, fibers 73b are less inclined to align than fibers 73a. Typically, lumped fibers 73c are unsuited for alignment since they are generally symmetrical and don't have a preferred alignment axis. As fibers 73a, and to the extent possible 73b, axially align in fluid streams 51, they tend to further disperse.

According to the invention, the accelerator 70 is formed as one or more chambers 74 having walls which interact with dispersion fluid 72 at the dispersion fluid stream boundaries. As a feature of the invention, at least some of the chamber walls are movable to engage the stream's lateral boundaries in order to accelerate fluid stream 51.

As best seen in FIG. 4, in preferred form, accelertor 70 is embodied as a multiplicity of chambers 74. It will be appreciated, however, that a single chamber could be used. Use of multiple chambers 74 is preferred since it increases the interaction and therefore the coupling efficiency between the dispersion fluid 72 and the chamber walls. Multiple chambers increase coupling efficiency by increasing chamber wall area available for interaction with fluid stream 51 and by reducing the cross-sectional dimension of the stream to be influenced.

As seen in FIG. 2, where for simplicity an exploded view of a single chamber 74 is shown, the chamber is seen to include end wall discs 75, 76, spacer disc 77 and sleeve 78. In the alternate embodiment, shown in FIGS. 5 and 6 to be discussed hereinafter, sleeve 78 is eliminated in favor of the housing inner wall 6.

As shown in FIG. 2, sleeve 78 is cylindrical, having an inner cylindrical surface 79 and an outer cylindrical surface 80. Sleeve 78 is formed in split halves 78a and 78b, each half having respectively inner and outer cylindrical surfaces 79a, 79b and 80a, 80b. In preferred form, sleeve 78 is formed in split halves to permit ease of assembly and insertion into chamber 8 of housing 2.

Chamber 74 is annular having opposite annular end walls, a radial inner side wall and a radial outer side wall. As shown in FIGS. 2 and 4, when assembled within housing chamber 8, discs 75, 76, and 77 are coaxially aligned and axially spaced. Disc 77 is located between discs 75, 76, axially spacing them in sleeve 78. When assembled sleeve 78 is itself coaxially positioned within chamber 8 with sleeve outer surface 80 abutting housing inner surface 6. Discs 75 and 76 form the respective annular chamber end walls. Outer annular face section 83 of disc 75 forms the first end wall and outer annular face section 84 of disc 76 forms the opposing second end wall. Outer circumferential surface 86 of disc 77 forms inner radial wall of chamber 74 and inner surface 79 of sleeve 78 forms the chamber's outer radial wall completing chamber 74.

Multiple chambers 74 are arranged axially contiguously using common end wall discs. For example, as best seen in FIG. 4, one end wall of chamber 74′ is annular face section 82 of disc 75 which is the reverse side of chamber 74's end wall, annular face section 83 of disc 75. Likewise chamber 74″ shares common end wall disc 76 with chamber 74. Annular section 85 of disc 76 is an end wall for chamber 74″ and the reverse face section 84 is an end wall for chamber 74. As shown in FIG. 4, the axial extreme radial end wall discs 88 and 89 are not shared and form respectively the end walls of the end chambers alone.

As seen in FIG. 4, the width of chamber 74 is determined by the length of spacer disc 77 and the height of chamber 74 is determined by the difference in radius of end wall discs 75, 76 and spacer disc 77. In preferred form, the radius of spacer disc 77 is selected to be large enough to avoid dispersion fibers 73 from wrapping around and becoming affixed to the outer circumference 86 of disc 77.

As shown in FIG. 3 annular chamber 74 has a curvilinear length extending from inlet port 22 to the far end 90 of process dispersion outlet port 41 adjacent outlet port 57. The curvilinear length of chamber 74 has an initial substantially linear section extending from port 22 to approximately the center line of body element 3 and a subsequent curved portion extending over the remainder of the curvilinear length. The width and length of chamber 74 is selected to permit interaction between chamber walls and the fluid stream boundaries sufficient to establish relative acceleration of the fluid 72 and fiber 73 centrally of the stream 51 in chamber 74.

As shown in FIG. 3, the length of chamber 74 is determined by the angular displacement of process dispersion outlet 40 from dispersion inlet 20 and the radius of end wall discs 75, 76. The displacement angle and the radius of discs 75, 76 are selected to establish a chamber sufficient in length to permit interaction between annular chamber walls and dispersion fluid stream 51 which will align a majority of fibers 73 in the fluid 72. The relative length of the curvilinear portion of chamber 74's length to the substantially linear portion is, in the preferred form, approximately 5 to 1.

As explained above and as shown in FIGS. 2 and 3, sleeve halves 78a and 78b are adapted to surround chamber end wall discs 75, 76 and spacer disc 77 to establish annular chamber 74 when these elements are assembled in housing inner chamber 8. To permit fluid communication between housing inner chamber 8 and annular chamber 74, sleeve 78 is provided with various ports. These various sleeve ports cooperate with the housing ports to permit fluid communication between the annular chamber 74 and the dispersion stream 51.

As seen in FIG. 2, sleeve 78 is provided with inlet port 100 located axially centrally of and at the top of sleeve half 78a. Port 100 aligns with and conforms to dispersion inlet port 22 in housing wall 4 when sleeve 78 is located in chamber 8. Accordingly, in preferred form, port 100 is generally rectangular.

Sleeve 78 also has a rejected fiber and foreign matter outlet port 101 formed as port halves 101a and 101b in sleeve halves 78a and 78b respectively. Port 101 extends axially to span the accelerator chamber end wall discs and fluidly couples chambers 74 to the fiber outlet port 57 and conduit 58 for discharging rejected bundled and lumped fibers and foreign matter. In preferred form, port 101 is generally rectangular in shape.

A system of further ports 102 are located in sleeve 78 at sleeve half 78a to permit fluid communication between chambers 74 and the process dispersion outlet port 42 and conduit 43. As will be more fully described in connection with the apparatus separator, ports 102 act to separate fiber bundles and lumps and foreign matter above a prescribed size from other dispersion fibers.

Concerning the relationship of end wall discs 75, 76 to sleeve 78, and as shown in FIG. 3, the inner radius of sleeve 78 approximates the radius of end wall discs 75, 76. In preferred form, the other circumferential edge of discs 75 and 76 are provided with radial projections 103 and 104 respectively best seen in FIG. 2. Radial projections 103 and 104 are thinner in width than the respective discs and extend beyond the radius of chamber 74's end wall faces 83, 84 as shown in FIG. 4.

To cooperate with radial projections 103, 104, sleeve inner surface 79 is provided with grooves 105 and 106. As best seen in FIG. 2, grooves 105 and 106 extend circumferentially at axial intervals over sleeve halves 78a and 78b. The groove axial spacing in the sleeve halves is set to correspond to the end wall disc spacing. The radial extent of the disc projections and the width and depth of the grooves are sufficient to permit free rotation of disc projections 103 and 104 without permitting fibers 73 to become lodged between the radial projection faces and the groove faces so as to impede rotation.

Concerning the mounting of discs 75, 76 and 77, as seen in FIG. 2, a drive shaft 110 is coaxially mounted in housing 2. Shaft 110 extends the length of housing body element 3 and is rotatively received in end caps 10a and 10b as for example by fluid sealing bearings 111, 112. Shaft 110 is also received through the centers of chamber end wall discs 75, 76 and spacer disc 77. The discs are fixably secured to the shaft in any convenient manner as for example by interference fit, set screws, keys, etc. and rotate with the shaft. Additionally, the discs 75, 76 and 77 are joined to one another in any convenient manner as for example by means of pins or screws 113 as shown in FIG. 2. End 114 of shaft 110 extends or is coupled through housing end cap 10a in a conventional manner and is fitted with a drive 120. In the preferred embodiment shown, drive 120 includes a housing pulley 121, coupled by V-belt 122 to motor pulley 123 mounted on the drive shaft of electric motor 124. It will be appreciated by those skilled in the art that any suitable means may be used to drive shaft 110.

C. The Separator

A separator for rejecting fiber bundles 73b and lumps 73c and foreign matter which are above a prescribed size and for passing other dispersion fibers to the process dispersion outlet 40 is provided in housing 2 by perforating the accelerator outer radial wall with a slot system. The slot system is formed in sleeve 78, which constitute the chamber outer radial wall, as best seen in FIGS. 2 and 4. The system comprises a single slot 102 of prescribed width and length per chamber. The single slot is located at the outer radial wall of each chamber 74 thereby rendering the outer radial wall at least partly open. The slot is centered in the outer radial wall with its width oriented in the direction of chamber 74's width and its length in the direction of chamber 74's length. Thus the slot width extends axially in sleeve 78 and the slot length extends circumferentially in sleeve 78.

Slot 102 has a width approximately equal to the maximum fiber bundle or lump diameter acceptable for inclusion in the non-woven product. In preferred form, the slot width is approximately equal to ten times the diameter of the fiber in the dispersion.

Since bundled and lumped fibers tend to grow having a cross section which will permit restricting their passage by restricting the slot in one dimension, this invention recognizes that the defects can be effectively screened out by restricting slot width alone. This approach applies equally well to foreign matter also. This realization permits the slot to be extended in length to increase the available screening area. Therefore the length of slot 102 is selected to extend over the circumferential length of process dispersion outlet port 42. In the preferred embodiment, the length of slot 102 is made equal to the height of port 42.

Separator slot 102 in the chamber's outer radial wall has a receiving face 130 which is provided with a gradually restricted profile. As best seen in cross-section, as shown in FIG. 4, slot 102 has a first larger width 131 at sleeve inner face 79b leading to a second narrower and more restrictive width 132 at sleeve outer face 80b. The effect of the gradually increasing restriction, or decrease in slot width, is to establish a venturi effect. As a result, as dispersion passes through slot 102, it is further accelerated permitting an additional alignment of fibers 73a and to the extent possible 73b as they pass through slot 102. In the preferred embodiment, the restriction profile of slot 102 is constant over its length.

As seen in FIG. 2, since slot 102 extends circumferentially of chamber 74's end wall, dispersion exiting chamber 74 washes dispersion and fibers along the length of slot 102. This arrangement not only permits use of slot 102's full length but continually washes slot 102 clean of rejected fiber bundles and lumps and foreign matter. The rejected bundles, lumps and foreign matter washed away are subsequently removed at outlet 55.

Figure 6:
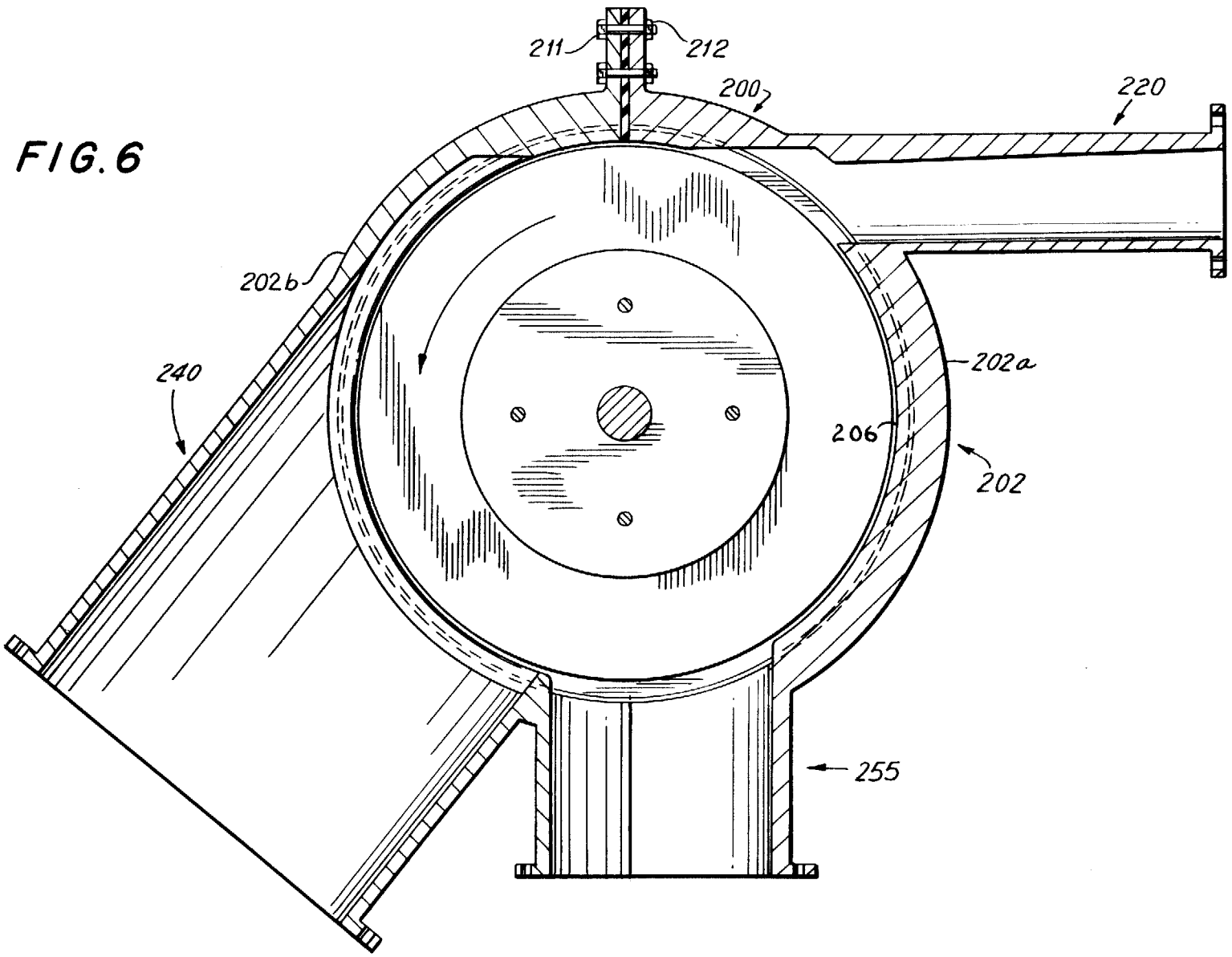
FIG. 6 is a section view of an alternate form of the apparatus housing in accordance with the Invention.

In the alternative embodiment of the invention shown in FIGS. 5 and 6, the apparatus 200 is provided with a housing 202 formed by axially split housing halves, 202a and 202b. As shown in FIG. 5, respective housing halves, 202a and 202b, are provided with flanges 209a and 209b respectively which extend over the axial perimenter of halves 202a, 202b. Flanges 209a and 209b are provided with holes 214a and 214b respectively located at the outer edge of flanges 209a and 209b for receiving bolts 211 which cooperate with nuts 212 for securing housing halves 202a and 202b together in fluid sealing relation.

Since housing 202 is formed in halves without end caps, housing halves 202a and 202b are provided with journal halves 210a and 210b located radially centrally of the housing for receiving drive shaft 310 which would be coupled to an appropriate drive not shown similar to drive 120 described with respect to the embodiment shown in FIGS. 1–4. As in the case of the embodiment shown in FIGS. 1–4, the embodiment of FIGS. 5 and 6 includes means for fluidly sealing Shaft 310.

In this form, the housing ends are formed closed, and end caps 10a and 10b of the embodiment shown in FIGS. 1–4 are eliminated. Like the embodiment of FIGS. 1–4, housing 202 is provided with a dispersion inlet 220, a process dispersion outlet 240, and a bundled and lumped fiber discharge outlet 255. Like the embodiment of FIGS. 1–4, the respective housing inlet and outlets are provided with corresponding ports and conduits to permit fluid communication with the interior chamber 208 of housing 202. Further, the orientation of the inlet and respective outlets are formed the same as those described with respect to housing of FIGS. 1–4.

The accelerator formed within housing interior chamber 208 is similar to that shown with respect to the embodiment of FIGS. 1–4 except that sleeve 78 is eliminated with the respect features of sleeve 78 being formed in the inner housing wall 206 established by housing halves 202a and 202b.

D. Operation

In operation, a dispersion source (not shown) supplies dispersion containing randomly oriented fibers 73a, bundled fibers 73b and lumped fibers 73c at a constant flow rate to apparatus 1. In preferred form, the dispersion fluid 72 is water including any desired additives such as wetting agents and viscosity modifiers as are well-known in the art. The apparatus 1 receives the dispersion at inlet 20 where the cross-section of inlet conduit end 25 establishes a dispersion stream 51 of an initial inlet velocity. Stream 51 thereafter proceeds down inlet conduit section 30 to conduit housing end 24 and inlet port 22. At port 22, the port's cross-section establishes a final stream inlet velocity as it enters housing interior chamber 8 and accelerator 70.

In the preferred embodiment, where the accelerator 70 includes a plurality of accelerator chambers 74, flow directing ribs 32, in fan array, divide dispersion stream 51 into multiple substreams and channel them to respective accelerator chambers. In the respective chambers, the substreams interact with chamber moving walls 83, 84, and 86. Walls 83, 84 and 86 are maintained at a substantially constant rotational speed by drive 120. Since the moving chamber walls are intended to accelerate the dispersion substreams, the substream final inlet velocity at inlet port 22 is made to be less than the velocity of the chamber walls. The substreams final velocity, however, is maintained sufficiently close to the wall velocity to avoid a large differential, this so to minimize turbulence and fiber entanglement.

The relationship of substream final inlet velocity to chamber wall velocity can be adjusted by varying either the substream final inlet velocity or the chamber wall velocity or both. In preferred form, the inlet port cross-section is set to accommodate desired process flow rates and a desirable range of chamber wall velocities. Final adjustment of the relationship is accomplished by varying the wall velocity over the desired range with drive 120 in a conventional manner. As noted, for a given flow rate, the cross-section of port 22 determines the final inlet velocity of the substreams. However, since port length is fixed, only variations in the port 22's height are available to set final inlet velocity. As explained in connection with the description of inlet 20, the axial length of port 22 is set to bridge all accelerator chambers 74 permitting dispersion to be supplied to all chambers simultaneously. As a result, the cross-section of port 22 and final velocity of the substreams is varied by varying the height of port 22.

In selecting port height, however, consideration should be given to upward deflection of stream 51 arising from interactions of stream 51 with rotating endwall discs 75, 76 as stream 51 enters accelerator 70. Upward deflection should be minimized in order to minimize stream turbulence and the associted likelihood of fiber entanglement. In the preferred embodiment, upward deflection is minimized by locating the bottom of Port 22 [circumfectively] *tangentially* on housing cyclindrical wall 4 at an angle $\phi$ of approximately 40° measured from the housing vertical center line as shown in FIG. 3.

Because of required process flow rates and desirable disc rotational velocity in the typical case, the substream final inlet velocity is less than the initial dispersion inlet velocity. Accordingly, the cross-section of inlet port 22 and conduit housing end 24 are greater than the cross-section of conduit source end 25. To permit smooth transition in the stream velocity and thereby minimize turbulence and fiber interaction, inlet conduit 23 is provided with the coupling section 30 of increasing cross-section in the direction of housing end 24. Therefore, as stream 51 proceeds down coupling section 30, the stream's velocity is gradually and smoothly reduced to minimize fiber entanglement.

To further minimize turbulence and the tendency for fibers to entangle, inlet 20 is mounted at the top of and tangent to housing body element 3. By mounting the inlet tangentially, the stream is admitted substantially perpendicularly to chamber 74's cross-section and in line with chamber 74's curvilinear length as best seen in FIG. 3. Introduction of dispersion substantially in line with chamber 74's curvilinear length avoids abrupt changes in stream direction and attendant turbulence at entrance. Further, by mounting inlet 22 at the top of body element 3, gravity is permitted to assist fiber movement in the curvilinear portions of chamber 74.

As best seen in FIGS. 3 and 4, and as noted previously, each annular chamber 74 has a curvilinear length defined by an initial substantially linear portion extending from inlet port 22 to approximately the center line of body element 3 and a curvilinear portion extending from the end of the linear section at element 3's center line to the chamber end at the far end 90 of outlet port 42 adjacent to outlet port 57.

As dispersion substreams are received in the linear section of each chamber 74, the respective moving walls 83, 84 and 86 engage the substream lateral boundaries to accelerate the substream in the general direction of the entering stream flow, as best seen in FIGS. 4 and 7. The width of chamber 74 as defined by the length of disc 77 is set so that the range of chamber wall velocities is capable of establishing fluid acceleration throughout the stream cross-section.

While acceleration of the dispersion fluid is generally in the direction of the stream flow, the accelerator actually has radial and angular components. The radial and angular acceleration components result from the annular form of chamber 74. Since inlet conduit 23 is mounted tangentially to the housing body element 3 and the arc subtended by this portion of the chamber is relatively small, while the radius of curvature large, the initial acceleration is in the direction of the entering dispersion substream. As noted above, inlet conduit 23 is mounted in this way to permit transition to the annular chamber with minimum turbulence.

Fluid acceleration causes the fluid to move relative to the disoriented fibers 73a bundled fibers 73b and lumped fibers 73c. This relative movement gives rise to drag forces on the filaments which tend to axially align fibers 73a in the direction of fluid flow as illustrated in FIGS. 3 and 4. As noted earlier, the shape and size of bundles 73b and lumps 73c render them either resistant or unable to align.

As fibers axially align, they tend to further disperse in stream 51, and are accelerated by the relative fluid movement. Unalignable fibers are simply accelerated by the relative fluid movement.

As the dispersion substream enters the curvilinear section of each chamber 74, the effect of the radial and angular acceleration produced by the chamber's moving walls becomes more pronounced. Since separator slot 102 is located in the chamber radial outer wall extending over its curvilinear length, chamber 74's outer wall is at least partially open and permits the dispersion substream to divert from the direction of the chamber's curvilinear length and pass out of the chamber to the dispersion outlet 40. Dispersion fluid and fibers located at the outer radial extent of chamber 74 in proximity to the outer wall, under the influence of the radial component of acceleration, are the first to attempt to pass out of the chamber. Other fibers located radially inwardly of the outer wall are moved angularly by the angular component of acceleration until the radial component and stream [low] *flow* carry them to the outer wall. Accordingly, aligned fibers and bundled and lumped fibers are accelerated radially and angularly and move outwardly toward and circumferentially of the outer chamber wall and slot 102.

Since slot 102 is oriented in chamber 74's outer wall with its width parallel to the chamber's width and its length parallel to the chamber's curvilinear length, fibers axially aligned in the substream may pass through slot 102. Fiber bundles and lumps and any foreign matter having a size larger than slot 102 however, may not pass and are rejected. In practice, manufacturers have found that fiber bundles of cross-section larger than ten times the fiber diameter in the non-woven product are objectionable. Therefore, the width of slot 102 in preferred form is set at ten times the fiber diameter.

The multiple dispersion substreams and aligned fibers that pass through slot 102 of each chamber 74 unite in outlet conduit 43 and are led away by outlet conduit 43 to further process stations.

Fiber bundles and lumps and foreign matter of size in excess of the slot width which are rejected at slot 102 are swept along the slot by the action of the dispersion flow, the chamber's moving walls and gravity to be discharged at outlet 55. Thereafter the rejected fibers and foreign matter are either discarded or processed for further use.

This invention recognizes that fiber defects and foreign matters may be screened and removed by placing a slot of restricted width only in a dispersion stream in which the dispersion fibers are axially aligned with the flow direction. Recognition of this permits the slot length to be increased as desired to increase rejection efficiency.

As noted, outlet 40 extends over the length of slot 102 and is mounted at an angle to housing 2 which permits smooth exit of the dispersion from the housing interior. In preferred form, the outlet conduit mounting angle $\Psi_2$ is selected to be between 30 and 50 degrees to chamber 8's vertical center line as seen in FIG. 3. Also in preferred form, the cross-section of outlet conduit 40 is selected to be sufficiently larger to reduce the dispersion stream velocity on exit from the interior housing 2 to minimize turbulence and the tendency for the fibers to intertwine.

Still further in preferred form, slot 102 is formed in chamber 74's outer radial wall with a face 131 of first width at the inner sleeve surface 79 which is larger than the width of its second face 132 at the outer sleeve surface 80. This cross-sectional profile, best seen in FIG. 4, creates a venturi effect as the dispersion substream exits housing 2 causing an acceleration of substream velocity which further aligns dispersed fibers 73 for passage through slot 102.

Finally, concerning operation of accelerator discs 75 and 76, as noted, the perimeter of discs 75 and 76 are in preferred form provided with radial extentions 103 and 104 which fit grooves 106 and 105 in sleeve 78, or in the alternate embodiment housing interior wall 206. In operation, the spacing between the faces of the projections and the grooves is set to permit the projections to move freely through the grooves without permitting fibers to become lodged therebetween to retard or obstruct disc rotation.

II

Method

The method of this invention concerns the improvement of fiber dispersions used in the making of non-woven fabrics by wet-laying. As previously noted, dispersions used in a wet-laying process include fiber filaments which have been cut to length and dispersed. Typically, this is done by pouring fibers of desired length into the dispersion fluid and mechanically agitating. To improve dispersion and reduce fiber intertwining, chemical additives such as wetting agents and viscosity modifiers, well-known in the art, may also be included.

Because of fiber defects arising when the fibers are first cut to length, the fibers may fail to separate when introduced to the dispersion. Failure of the fibers to initially separate results in fiber bundles within the dispersion. Or, if the fibers do initially separate, they may subsequently entangle as a result of interaction during agitation, creating fiber lumps. This lumping problem becomes more pronounced the longer, thinner, and more flexible the fibers are as noted earlier. If left in the dispersion, these defects cause nonuniform density defects in the finished non-woven product which render the product commercially unacceptable.

The method aspect of the invention includes a series of steps which permit the aligning and dispersing of individual fibers in a fluid dispersion for the making of non-woven fabric by wet-laying and the separation of bundled and lumped fibers above a prescribed size from the dispersion. The result is a non-woven fabric having fewer and less objectionable density variations.

As a first step in the method, a dispersion stream is produced from dispersion received from a source. The dispersion includes a fluid and randomly oriented fibers. The fluid may include chemical additives such as commonly known wetting agents and viscosity modifiers. The fibers typically include disoriented individual fibers and bundled and lumped fibers. As explained with respect to the apparatus, dispersant is received at the apparatus inlet and converted to a stream having a controlled inlet velocity. In preferred form, as noted earlier, multiple substreams of controlled inlet velocity are established.

Following formation of the stream, or multiple substreams the method calls for the dispersion to be diverted over a curvilinear path. According to the invention, the path includes a first linear portion which provides a smooth transition from the dispersion direction as received, to a second curved portion. In the apparatus, the path is defined by the accelerator chamber's curvilinear path. As described previously, the chamber includes a first substantially linear portion to permit coupling of the dispersion with minimal turbulence and attendant fiber intertwining. Subsequently, the dispersion is directed over the curved portion of the path. In the apparatus, this constitutes directing the dispersion over the curved portion of the chamber's curvilinear length.

In the method, as the dispersion is directed over the curvilinear path, it is accelerated at its lateral boundaries. The method contemplates accelerating the dispersion across the entire cross-section. While it is anticipated that the acceleration may not be uniform, it is sufficient that some acceleration is provided in order to produce some relative movement between the dispersion fluid and the individual fibers. In the preferred method, the acceleration applied includes both radial and angular components with respect to the curvilinear path. These components assist movement of the dispersion over the desired path. As described with respect to the apparatus, the acceleration is applied to the dispersion boundaries by the rotating annular chamber walls. Accordingly, the acceleration is applied at the dispersion boundaries with a radial and angular component.

As a result of the acceleration of the fluid, the fluid is caused to move relative to the dispersion fibers. This relative movement causes the individual disoriented fibers to axially align in the direction of the accelerated fluid. As the individual fibers align they tend to more uniformly disperse. As explained in connection with the apparatus operation, bundled and lumped fibers are also subject to the relative movement of the fluid. However, their size and shape may prevent or limit any alignment. For example, lumped fibers arising from intertwining tend to nucleate and grow symmetrically resulting in a general spherical lump. As a result, the lump is without a preferred axis along which to align. In the case of bundles caused by fibers failing to initially separate, while an axis for alignment may exist, bundle size and flexibility may discourage alignment in the stream.

As a next step in the method, the lumped and tangled fibers are separated from the dispersion. In this step, the dispersion is presented to a screen which blocks the passage of bundled and lumped fibers and any foreign matter having a cross-section larger than a prescribed size. In the preferred method, lumps and bundles and foreign matter having a cross-sectional diameter larger than ten times the fiber diameter are rejected.

Screening is accomplished by presenting a lateral stream boundary to the screen. Preferrably, the stream boundary is along the outer lateral side of the stream as it is directed along the curvilinear path. This permits the aligned individual fibers and lumped and tangled fibers and foreign matter of cross-section below the prescribed limit to pass through the screen. In preferred form, the dispersion passing through the screen is thereafter led away in a direction which is substantially the same as the direction of the dispersion through the screen so as to minimize the turbulence and attendant fiber intertwining. In the apparatus, the screen is constituted by the separator rectangular slot located at the chamber outer radial wall.

Finally, the process includes a step of washing rejected bundled and lumped fibers and foreign matter from the screen. In this step, the dispersion itself is used to wash the rejected fibers and foreign matter from the screen. As explained in connection with the apparatus operation, the washing action arises from the direction of dispersion flow over the chamber curvilinear path caused by the acceleration chamber and its wall. It is therefore the circumferential component of dispersion flow that principally contributes to the washing action. In the preferred method, the curvilinear path is arranged so the washing action is further assisted by gravity.

While we have described the apparatus and method of the invention in the particular embodiment, it will be understood that various additions, substitutions, modifications and omissions may be made to the invention without departing from its true spirit.

What we claim is:

1. Method for screening, separating and removing fiber defects and foreign matter above a prescribed size from a dispersion of thin, long, flexible fibers having length to diameter ratios above 400 to 1, the dispersion intended for use in the formation of non-woven fabrics by wet-laying, the method comprising:

(a) producing a fiber dispersion stream of the thin, long, flexible fibers, the dispersion including a dispersion fluid, disoriented individual fibers, and lumped and tangled fibers;

(b) directing the stream over a substantially linear path to a curvilinear path at an entrance of an annular chamber having sidewalls[,] *and endwalls,* wherein the stream is introduced substantially tangential to the curvilinear path to avoid abrupt changes in stream direction and to avoid turbulence at the entrance;

(c) rotating *at least* the [side] *end* walls to accelerate, throughout the cross-section in the direction of stream flow, the dispersion fluid relative to the disoriented fibers and lumped and tangled fibers to axially align and disperse the disoriented fibers in the stream;

(d) screening the lumped and tangled fibers above a prescribed size from the dispersion by presenting a lateral stream boundary to a screen comprising a plurality of tapered slots through which the disoriented fibers are aligned and accelerated to prevent passage of lumped and tangled fibers having a size above a prescribed value through the screen and permitting passage of other fibers through the screen; and (e) washing accumulated lumped and tangled fibers prevented passage through the screen with the dispersion fluid and discharging the lumped and tangled fibers from the stream.

2. The method of claim 1 wherein the step of accelerating the dispersion fluid includes imparting radial and angular components of acceleration at the stream's lateral boundaries.

3. The method of claim 2 wherein the dispersion passing through the screen is diverted from the screen in a direction substantially the same as the direction of the stream passing through the screen so as to minimize turbulence.

* * * * *

UNITED STATES PATENT AND TRADEMARK OFFICE

CERTIFICATE OF CORRECTION

PATENT NO. : RE 32,182

DATED : June 17, 1986

INVENTOR(S) : Ring et al.

It is certified that error appears in the above-identified patent and that said Letters Patent is hereby corrected as shown below:

ON THE TITLE PAGE:

Under Foreign Patent Documents

"898708 4/1972" should be --898708 11/1972--

"955563 10/1974" should be --955563 5/1974--

"2526657 12/1976" should be --2526657 4/1976--

Col. 1, line 13, "267,707" should be --246,707--

Col. 6, line 55, "separtion" should be --separation--

Col. 8, line 40, "conduits" should be --conduit--

Col. 9, line 40, "accelertor" should be --accelerator--

Col. 14, line 6, "associted" should be --associated--

Signed and Sealed this

Twenty-fourth Day of November, 1987

*Attest:*

*Attesting Officer*

DONALD J. QUIGG

*Commissioner of Patents and Trademarks*